United States Patent [19]

Montgerard

[11] Patent Number: 4,643,476
[45] Date of Patent: Feb. 17, 1987

[54] MOBILE BAND INSTRUMENT REPAIR SHOP

[76] Inventor: William E. Montgerard, 3232 Vermillion St., Danville, Ill. 61832

[21] Appl. No.: 781,873

[22] Filed: Sep. 30, 1985

[51] Int. Cl.$^4$ .............................................. B60R 11/00
[52] U.S. Cl. ............................. 296/24 R; 144/286 R; 269/900; 248/240.4
[58] Field of Search .......................... 296/24 R, 1 R; 144/286 R, 3 R; 269/900, 901, 303, 305; 248/240.4, 240.2

[56] References Cited

U.S. PATENT DOCUMENTS

| | | | |
|---|---|---|---|
| 1,444,025 | 2/1923 | Copp | 296/24 R |
| 2,147,800 | 2/1939 | Sadowski | 369/900 |
| 3,608,886 | 9/1971 | Greene | 269/305 |
| 3,633,970 | 1/1972 | Langhals | 296/24 R |
| 4,181,347 | 1/1980 | Clark | 296/24 R |

*Primary Examiner*—Robert R. Song
*Attorney, Agent, or Firm*—Woodard, Weikart, Emhardt & Naughton

[57] ABSTRACT

A mobile band instrument repair shop is disclosed which includes a movable trailer with a structure having four interior walls and a door, each wall being arranged and specially equipped to perform different tasks in repairing all band instruments. The first wall is a customer service and instrument receiving area. The second wall is a brass department. The third wall is a woodwind department, and the fourth wall is a storage area. The brass department includes two different work stations. The first work station includes a foldable table for supporting a variety of different shaped instruments. A plurality of holes in the table receive posts in various configurations to accommodate the different instruments. The second station includes a plurality of different shaped and sized mandrels, and a mandrel holding fixture to hold various instruments during dent removal operations. Bannister rods, removably mounted to the floor, are also included at the second station for holding instruments awaiting repair. The woodwind department includes a shelf with upwardly projecting dowel rods which are received into cavities in woodwind instruments to hold them. A work surface and storage compartments for tools and spare parts are also included in the woodwind department. The storage area includes shelves and hangers for storing instruments and instrument cases. The trailer is also equipped with bottled gas and electrical distribution systems.

19 Claims, 13 Drawing Figures

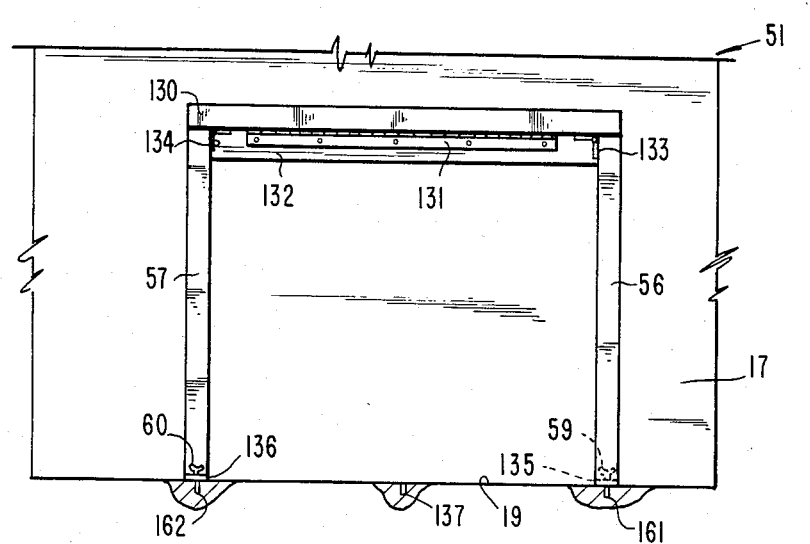
Fig.7
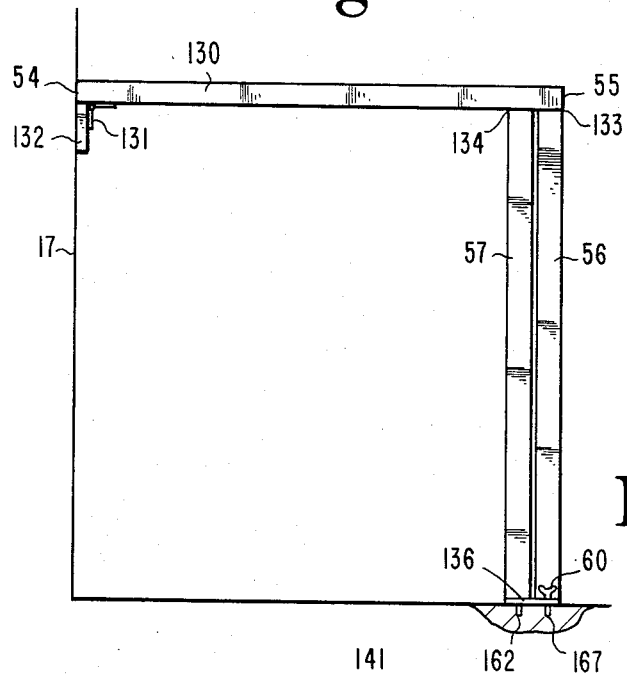
Fig.8
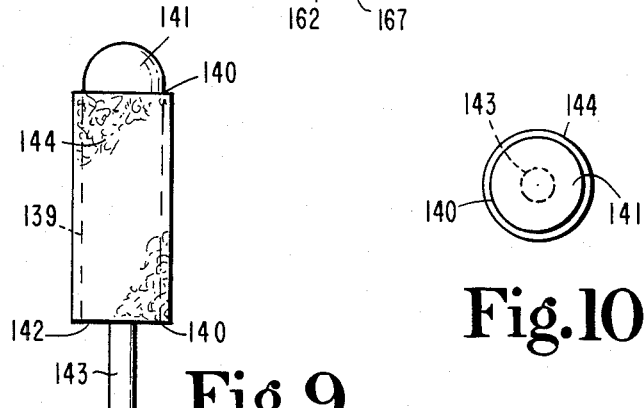
Fig.9
Fig.10

MOBILE BAND INSTRUMENT REPAIR SHOP

BACKGROUND OF THE INVENTION

1. Field of the Invention

The present invention relates generally to the field of vehicles having repair facilities, and specifically to such a vehicle for transporting and use during operation of band instrument repair equipment.

2. Description of the Related Art

For the purpose of providing mobile repair facilities readily transportable from job site to job site, several and various designs have been proposed in the related art. The prior art devices have addressed various service needs by uniquely equipping transportable workshops to perform specific tasks.

Several of the related art devices include a motorized general purpose traveling workshop for use during war described in the U.S. Pat. No. 2,365,940, issued to Couse on Dec. 26, 1944; a woodworking shop mounted in a trailer described in the U.S. Pat. No. 4,055,206, issued to Griffin on Oct. 25, 1977; a motorized self-contained van for servicing automobiles in remote regions described in the U.S. Pat. No. 4,230,358, issued to Legueu on Oct. 28, 1980; a van including a power source having vehicle testing equipment for testing the electrical performance of a motor described in the U.S. Pat. No. 3,697,123, issued to Gygrynuk on Oct. 10, 1972; a mobile muffler shop mounted on a truck and including tubing bending equipment described in the U.S. Pat. No. 3,844,158 issued to Mercer on Oct. 29, 1974; a self-contained kitchen unit for placement in a van type vehicle described in the U.S. Pat. No. 3,888,539 issued to Niessner on June 10, 1975; and a mobile voting service located in a motorized vehicle described in the U.S. Pat. No. 4,377,367 issued to Smith on Mar. 22, 1983.

As relates particularly to the present invention, there has not been provided heretofore a mobile facility for repairing band instruments. One obstacle has been the necessity of designing the necessary fixtures to serve multiple functions and to accommodate the variety of band instruments needing repair at a given job site. Another problem was including, within a limited space, the equipment and replacement parts necessary to repair an entire band. The present invention is addressed to overcoming these problems.

SUMMARY OF THE INVENTION

One aspect of the present invention is a portable facility for repairing band instruments including a mobile chassis, an enclosed structure mounted to the chassis, table means mounted within the enclosed structure for supporting a variety of band instruments, the table means including a top surface having a plurality of spaced apart receiving holes, and a plurality of abutting posts, the abutting posts being received into the receiving holes and extending upwardly from the top surface, the abutting posts being positioned in the receiving holes in various configurations to cause the abutting posts to abut against the variety of shapes of band instruments to be supported by the table means.

Another aspect of the present invention is a mobile band instrument repair shop including a frame, a plurality of ground-engaging wheels rotatably mounted on the frame, a body mounted on the frame, the body having a pair of oppositely disposed sides, a pair of oppositely disposed ends, a floor, and a ceiling, the body including a door providing entry to the interior of the body, hitch means attached to the frame for connecting the frame to a drive source to transport the shop, a bottled gas distribution system including a gas storage tank mounted to the frame, tubing connected to the tank, and selected distribution locations in the interior of the body, the tubing extending from the tank to the selected distribution locations, an electrical distribution system operatively disposed within the body, the electrical distribution system including a receptacle on the exterior of the body connectable to a source of electrical energy, and a plurality of electrical outlets on the interior of the body, the electrical outlets being electrically connected to the receptacle, a table mounted within the body including a top surface, the top surface having a plurality of spaced apart receiving holes, a plurality of abutting posts, the abutting posts being received into the receiving holes and extending upwardly from the top surface, the abutting posts being positioned in the receiving holes in various configurations to cause the abutting posts to abut against the variety of shapes of band instruments to be supported by the table means, a plurality of mandrels being shaped and sized to be received into the cavities of various band instruments, mandrel mounting means for interchangeably holding the mandrels including two mating members, each mating member having a plurality of semi-cylindrical channels forming cylindrical holes in which the mandrels are held when the mating members are aligned and forced together, and a vise attached to the body, the mating members being grippingly forced together by the vise.

A further aspect of the present invention is a mobile band instrument repair shop including a frame, a plurality of ground-engaging wheels rotatably mounted on the frame, a body mounted on the frame, the body having a first entry wall, a second opposite wall, a third front wall, a fourth back wall, a floor, and a ceiling, the body including a door located on the entry wall near the front wall providing entry to the interior of the body, a customer service and instrument receiving station located along the third front wall, the customer service and receiving station including a table and a chair attached to the body, and a brass department located along the second opposite wall including a first work station near the third front wall and a second work station located toward the fourth back wall, the first work station including table means attached to the body for supporting various band instruments and torch means for heating the band instruments during soldering and welding operations, the second work station including an electrically-powered rotary metal brush, a plurality of mandrels, and mandrel holding means for interchangeably holding the mandrels, the mandrels being shaped and sized to insert into various band instruments to provide support and backing during dent removal operations, the second station also including tapered bannister rods removably mounted at one end to the floor directly in front of the second work station, the bannister rods extending upwardly and being received into cavities in band instruments to hold the band instruments completed or waiting to be operated on at the second station.

It is an object of the present invention to provide a mobile band instrument repair facility.

Another object of the present invention is to provide a job site band instrument repair facility for repairing all band instruments which is readily transportable.

Another object of the present invention is to provide, in a portable band instrument repair facility, tool storage for all equipment required to operate such facility.

Another object of the present invention is to provide a complete onsight portable band instrument repair facility including storage for many spare parts needed for repairing different models of all band instruments.

Another object of the present invention is to provide, in a trailer for easy transportation, a facility for repairing band instruments including electrical and bottled gas distribution systems to operate equipment necessary for repairing band instruments.

Another object of the present invention is to provide a complete onsight band instrument repair facility including a table for holding a variety of different shaped instruments to be worked on.

Another object of the present invention is to provide a complete onsight band instrument repair facility including mandrels of various shapes and sizes to accommodate different band instruments.

Another object of the present invention is to provide a complete onsight band instrument repair facility including a mandrel holder to hold and position the various shaped mandrels for use with different band instruments.

Another object of the present invention is to provide a complete onsight band instrument repair facility including a customer service and instrument receiving station, a brass station, a woodwind station, and a storage area having the necessary equipment and accessories to repair all band instruments.

Further objects and advantages of the present invention will become apparent from the description of the preferred embodiment which follows.

BRIEF DESCRIPTION OF THE DRAWINGS

FIG. 7 is enlarged fragmentary front view of the instrument supporting table of FIG. 4 in the erected position.

FIG. 8 is a fragmentary side view of the instrument supporting table of FIG. 7.

FIG. 9 is an enlarged side view of one of the abutting posts shown in FIGS. 7-8.

FIG. 10 is a top view of the abutting post shown in FIG. 9.

DESCRIPTION OF THE PREFERRED EMBODIMENT

Figure 1:
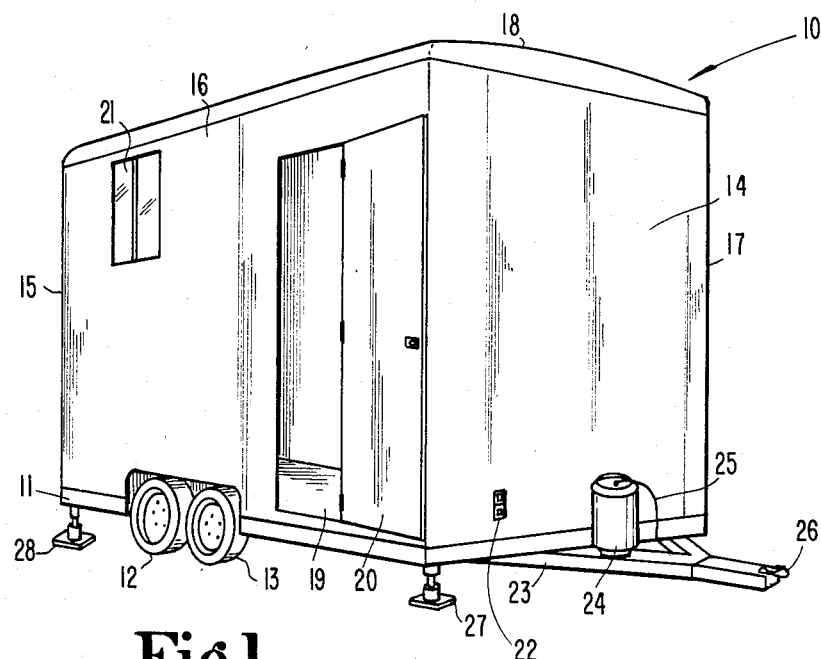
FIG. 1 is a perspective view of a mobile band instrument repair shop according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now more particularly to FIG. 1, there is shown mobile band instrument repair shop 10. In the preferred embodiment shown in FIG. 1, shop 10 includes frame 11 having wheels 12 and 13 typical on each side of frame 11. Mounted on frame 11 is an enclosure defined by front wall 14, back wall 15, entry wall 16, opposite wall 17, ceiling 18, and floor 19. In the preferred embodiment, door 20 is located near the front of shop 10 on entry wall 16 and window 21 is also included on entry wall 16. On the outside of front wall 14, there is included electrical receptacle 22. During operation of shop 10, receptacle 22 is connected to a source of electrical energy and distributes electricity to electrical outlets within shop 10. Frame 11 includes tongue portion 23 having mounted thereof gas cylinder 24 including tubing 25 extending from cylinder 24 to locations within shop 10 to distribute bottled gas. Liquid propane is used in the preferred embodiment. Tongue portion 23 also includes hitch 26 connectable to a powered vehicle to transport shop 10. In the preferred embodiment, a van is used by the repairman to transport shop 10. Once shop 10 is transported to a work site, it is necessary to employ jacks 27 and 28, typical on both sides of shop 10, to level and stabilize shop 10. In the preferred embodiment, a 14-foot trailer is used as the mobile structure for the mobile instrument repair shop.

Figure 2:
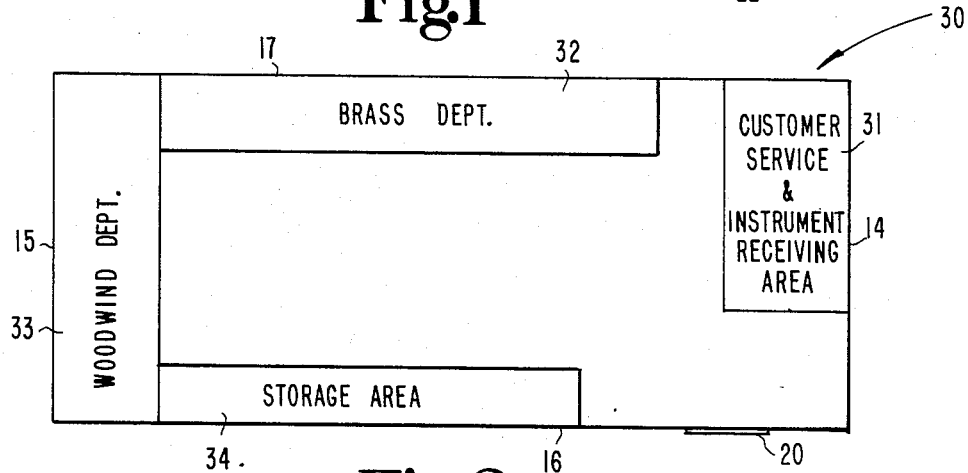
FIG. 2 is a floor plan of the mobile band instrument repair shop shown in FIG. 1.

Floor plan 30 of shop 10 is shown in FIG. 2. Upon entry through door 20, customer service and instrument receiving area 31 is encountered on front wall 14. Brass department 32 is located along opposite wall 17. Along back wall 15 is located woodwind department 33. Storage area 34 is located along entry wall 16 to the left upon entering door 20. Each wall, with its associated department, includes specific fixtures and structures to perform various tasks in repairing band instruments. For example, woodwind instruments have pads and springs which must be replaced by gluing. Brass Instruments have slides that incur dents which must be removed. The differences between the brass and woodwind instruments result in different arts and separate tools for repairing them, therefore, different departments are desirable.

Figure 3:
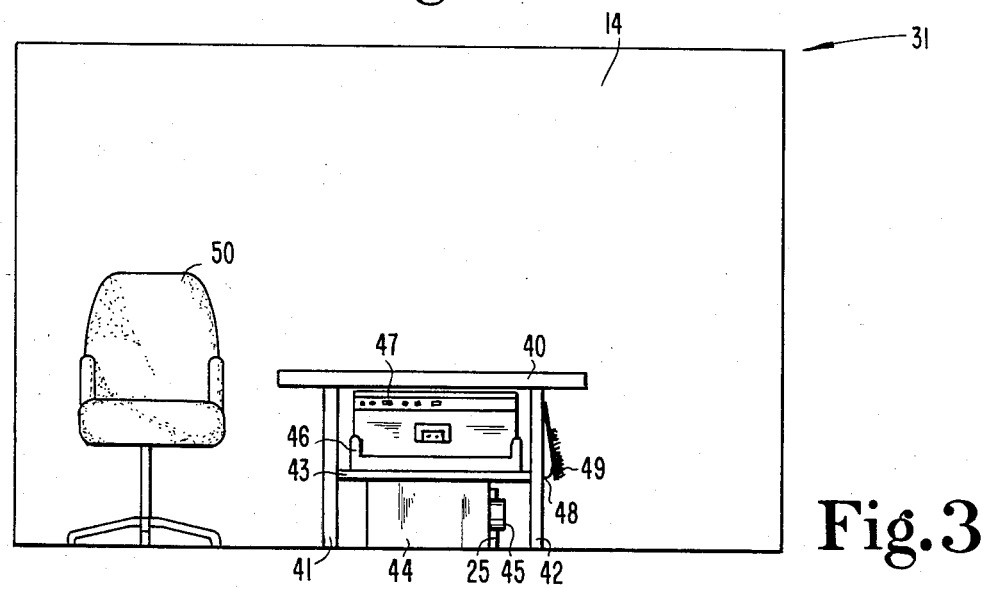
FIG. 3 is a front view of the front wall located inside the mobile shop of FIG. 1, particularly showing the equipment included in the customer service and instrument receiving area shown in FIG. 2.

The interior walls of shop 10 are shown in FIGS. 3 through 6 and will now be more particularly described. Customer service and instrument receiving area 31 along front wall 14 is shown in FIG. 3. Customer service and instrument receiving area 31 includes a station having counter surface 40, vertical supports 41 and 42, and horizontal support 43. Located between vertical supports 41 and 42 and beneath horizontal support 43, and resting on floor 19, is gas furnace 44 connected to gas cylinder 24 by tubing 25. Duct 45 directs heated air into the interior of shop 10. Located between vertical supports 41 and 42 and attached on top of horizontal support 43 is retaining piece 46 which holds secure radio/cassette player 47. Hanging on the outside of vertical support 42 is dust pan 48 and brush 49 used to clean the interior of shop 10. Swivel chair 50 is provided for use by customers and the repairman. Chair 50 serves a dual purpose by swiveling to face both counter surface 40 for placement of repair orders, and instrument support table 51, shown in FIG. 4, for working on brass instruments.

Figure 4:
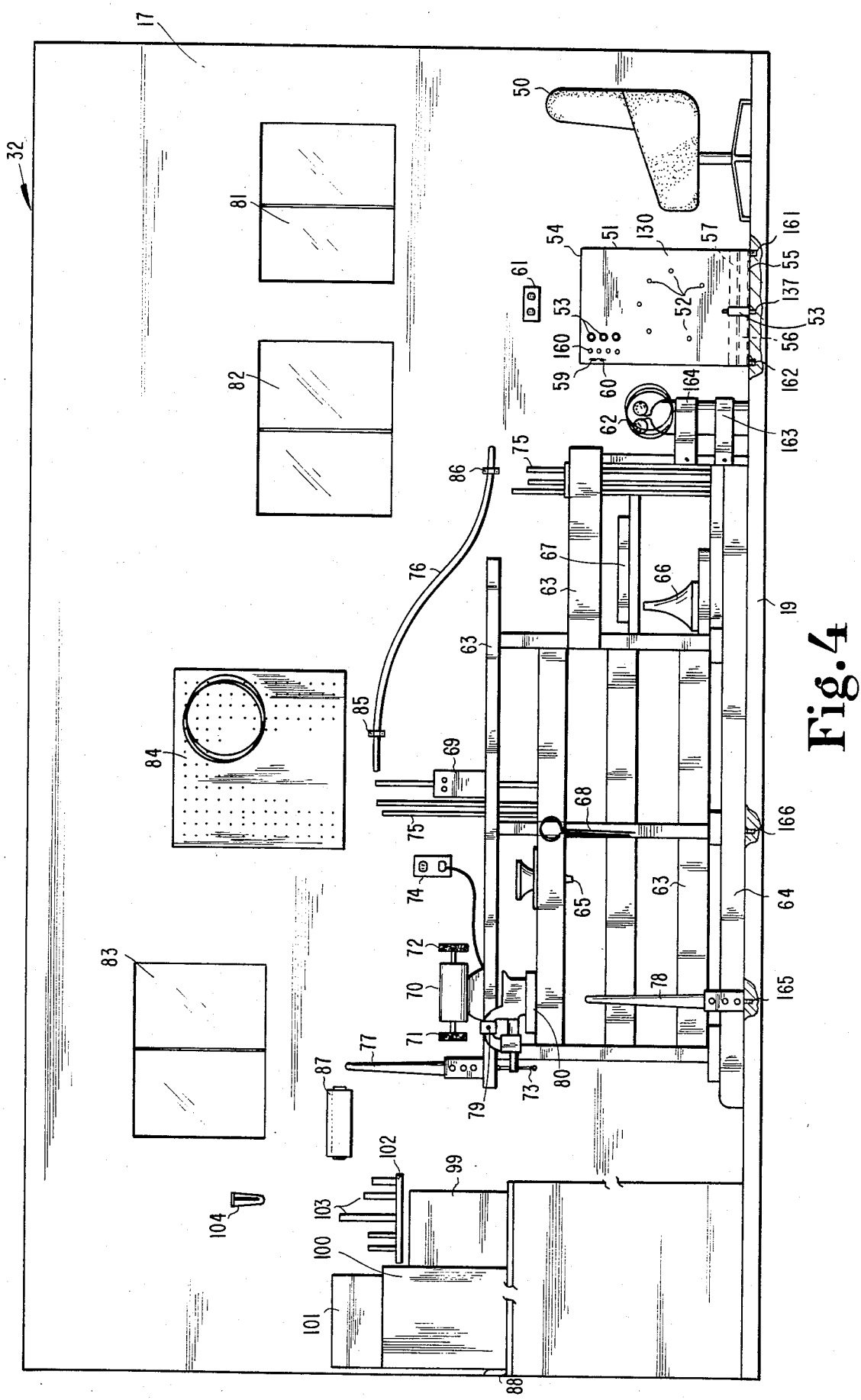
FIG. 4 is a fragmentary front view of the wall located opposite the entry wall inside the mobile shop of FIG. 1, particularly showing the equipment included in the brass department shown in FIG. 2 and the threaded inserts in the floor.

Brass department 32 along opposite wall 17 is shown in FIG. 4. In the preferred embodiment, two separate work stations are set up within brass department 32. The first work station involves performing the work of welding and soldering brass instruments and is located generally around instrument support table 51. Instrument support table 51, shown in FIG. 4 in a folded down position, includes receiving holes 52 positioned to receive abutting posts 53 in various configurations to conform to the shape of a variety of brass instruments. In the preferred embodiment, abutting posts 53 are received into receiving holes 52 in configurations allowing instrument support table 51 to hold brass instruments including the baritone horn, the french horn and the tuba. Dowel pins 160 may also be received into receiving holes 52 to hold the slides of the brass instruments. Instrument support table 51 is hingedly attached to opposite wall 17 at table edge 54. In its erected position, table 51 is in a horizontal position and is supported at table edge 55 by support legs 56 and 57. Support legs 56 and 57 are anchored to threaded inserts 161 and 162 located flush within floor 19. Wing screws 59 and 60, used to anchor support legs 56 and 57 to threaded inserts 161 and 162 are stored in holes in table 51, as are abutting posts 53 and dowel pins 160, when the table is in its folded, stored position. An abutting post 53 may be placed in non-threaded hole 137 in floor 19 to retain table 51 in the folded position. Electrical outlet 61 is located above table 51 to provide electrical energy to electrically powered work tools such as a hand drill. Outlet 61 is electrically connected to receptacle 22 located on the outside of front wall 14. Acetylene torch 62 is conveniently located near table 51 and is used during welding and soldering operations. The tank portion of torch 62 is attached to shelving structure 63 with mounting straps 163 and 164.

The second work station in brass department 32 includes shelving structure 63 and the accompanying special equipment contained therein and attached thereto. Shelving structure 63 is built above and partially supported by wheel well 64. Some of the special equipment stored within shelving structure 63 include flaring fixtures 65 and 66, box 67 containing conventional dent balls, and handled cleaning rods 68. Special tools mounted to shelving structure 63 include flute tenon roller straightening tool 69, electric grinder 70 including wire brushes 71 and 72, and conventional gripping vise 73. Electrical energy is supplied to electrical grinder 70 by electrical outlet 74. Further special tools included in the second station for removing dents in brass instruments include a selection of various sized and shaped straight mandrels 75 and curved mandrel 76, banister rods 77 and 78, and mandrel holding fixture 79. Curved mandrel 76 is specially designed for holding the french horn. Mandrel holding fixture 79 is grippingly secured by vise 73. Vise 73 is mounted to horizontal projection 80 which is attached to shelving structure 63. In the preferred embodiment, banister rods 77 and 78 can be removably mounted to floor 19 by threaded inserts 165 and 166 mounted flush therein. During repair operations, banister rods 77 and 78 are used to hold instruments being worked on while mandrels 75 and 76 are removed and replaced within holding fixture 79. When not attached to floor 19, bannister rods 77 and 78 are stored in holes in shelving structure 63. Other features on opposite wall 17 include windows 81, 82 and 83, peg board 84, mandrel holding clips 85 and 86 for holding curved mandrel 76, and paper towel holder 87.

Figure 5:
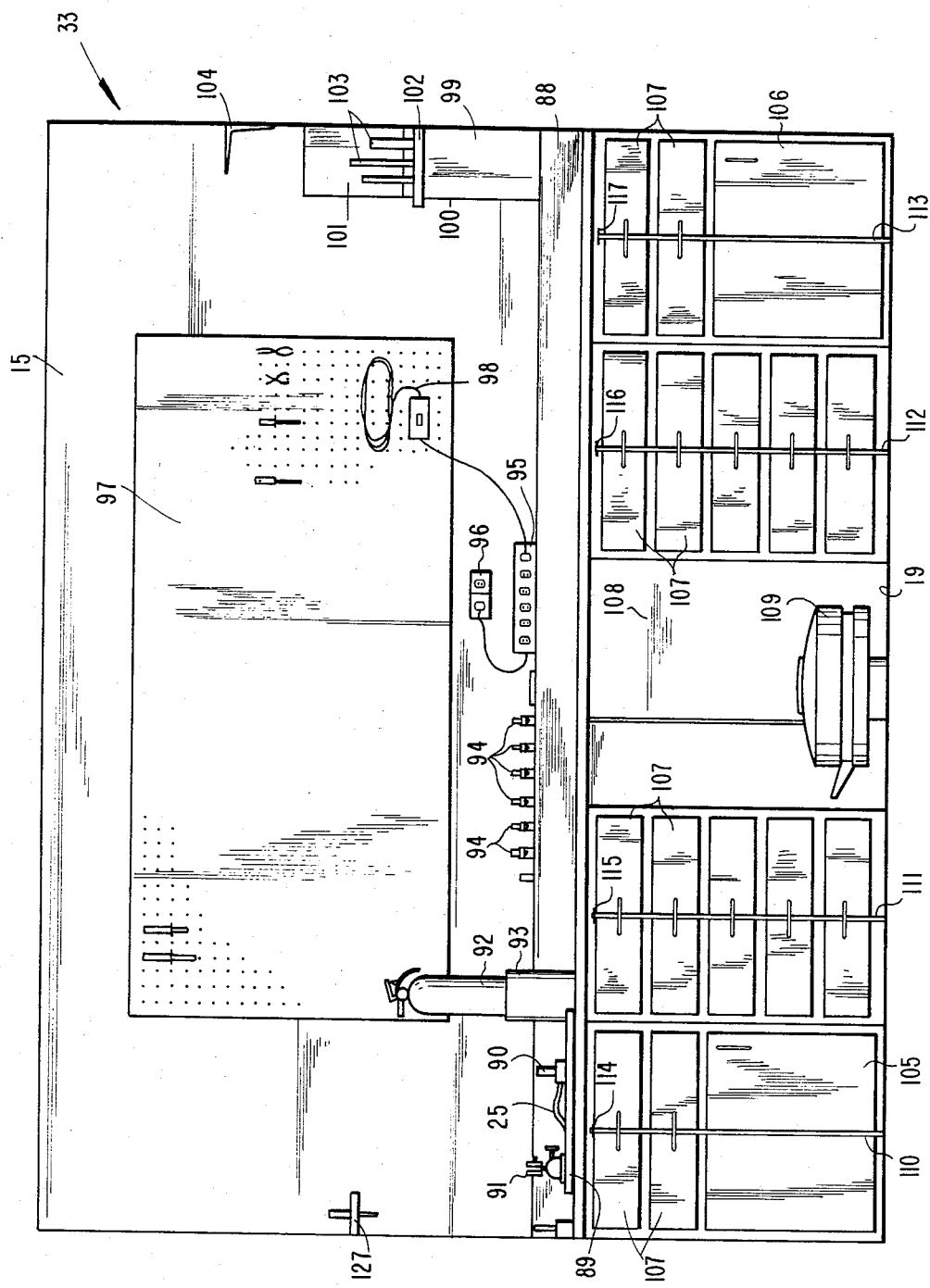
FIG. 5 is a front view of the back wall located inside the mobile shop of FIG. 1, particularly showing the equipment included in the woodwind department shown in FIG. 2.

Woodwind department 33 is located along back wall 15 and is shown in FIG. 5. Woodwind department 33 includes horizontal work surface 88 extending across the width of back wall 15. Attached to work surface 88 is heat resistant surface 89. In the preferred embodiment, heat resistant surface 89 is a separate piece of Bakelite or asbestos. Mounted on heat resistant portion 89 is bunsen burner 90 and hobby vise 91. Bunsen burner 90 is connected to gas cylinder 24 by tubing 25. Located in close proximity to bunsen burner 90 is fire extinguisher 92 contained within tin can 93. Mounted on the back edge of horizontal work surface 88 are repairman's instrument mouthpieces 94. The repairman's mouthpieces are used to test any woodwind instrument being repaired such as an oboe, flute, clarinet, saxophone, or bassoon. Also along the back edge of work surface 88 is switchable electrical outlet buss 95 connected to electrical outlet 96. Electrical outlet 96 is connected to receptacle 22. Above work surface 88 is located peg board 97. Mounted on peg board 97 is switchable soldering iron 98. On the right-most end of work surface 88 are storage compartments 99, 100, and 101. Housed within storage compartments 99 through 101 are miscellaneous instrument parts. Located above storage compartment 99 is shelf 102 including various sized upwardly projecting dowel rods 103. During clarinet repairing operations, clarinets are fitted over dowel rods 103, which hold the clarinets upright while repaired parts are allowed to dry. Mounted on opposite wall 17 and projecting over the right end of surface 88 is L-shaped bracket 104. L-shaped bracket 104 is used to hang instrument cases having been repaired and waiting to dry. Located beneath work surface 88 are storage cabinets 105 and 106, and storage drawers 107. Located within the drawers and cabinets are tools and instrument parts including, but not limited to, saxophone pads and parts, flute parts, specialty parts for woodwinds, case latches, hinges and handles, case rivets, glues, clarinet parts, cork items, brass instrument parts, springs, drills, electrical cords, heavy tools, large dent balls, and jacks 27 and 28, typical, when not in use. Located beneath work surface 88 in space 108 is vacuum cleaner 109. Storage cabinets 105 and 106, and drawers 107 are retained in place during transportation of shop 10 by dowel rods 110 through 113. Dowel rods 110 are positioned within the handles on drawers 107 and are secured by being threaded through and retained by eye screws 114 through 117 located above drawers 107 and just below work surface 88.

Figure 6:
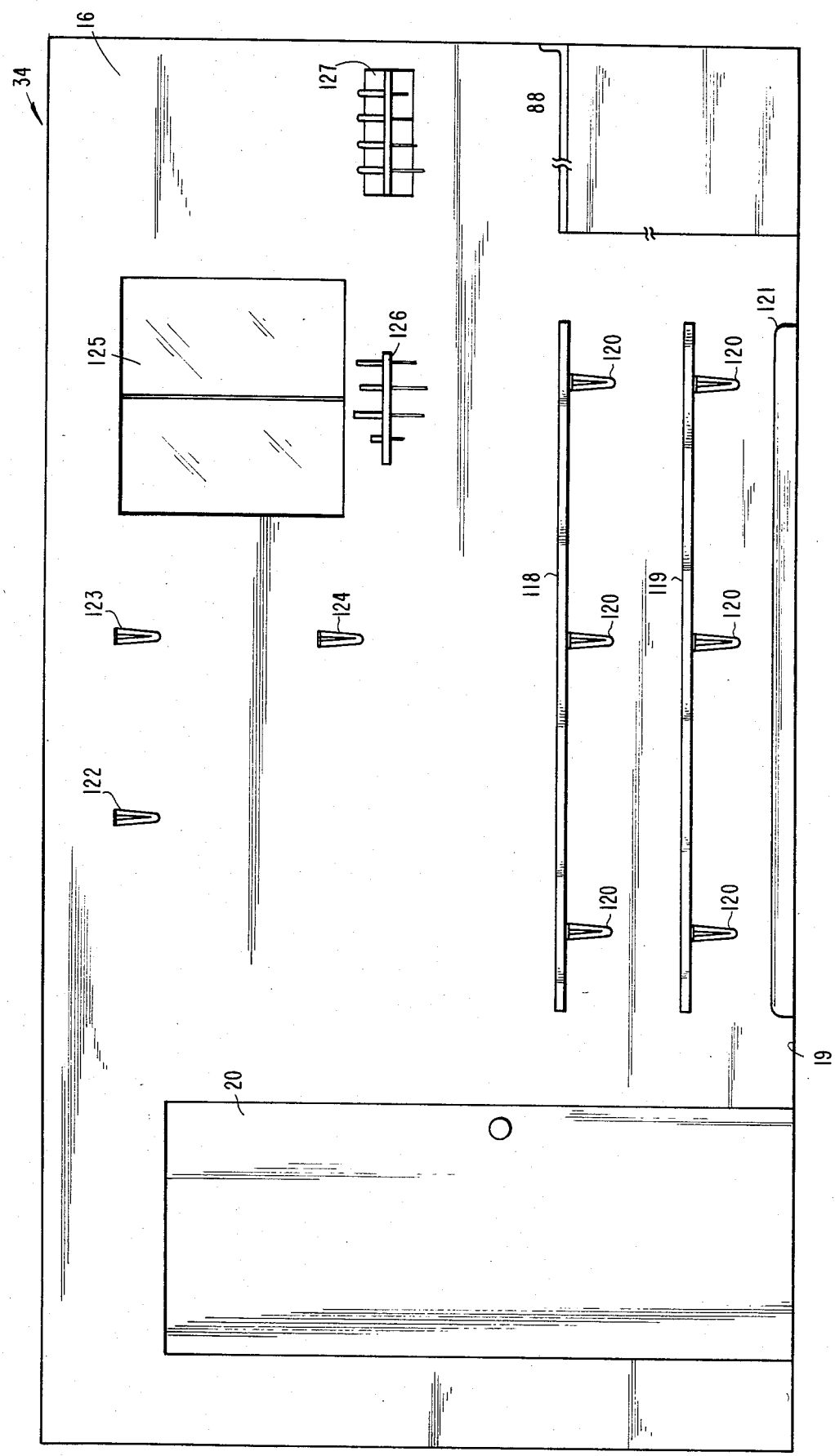
FIG. 6 is a fragmentary front view of the entry wall located inside the mobile shop of FIG. 1, particularly showing the equipment included in the storage area shown in FIG. 2.

Storage area 34 is located along entry wall 16 and is shown in FIG. 6. Storage 34 includes horizontal storage shelves 118 and 119 extending across the area bounded by door 20, and work surface 88 and cabinet 105 situated therebeneath. Storage shelves 118 and 119 are supported by L-shaped brackets 120. Located beneath shelves 118 and 119 is wheel well 121. On the wall above shelves 118 and 119 are mounted L-shaped brackets 122 through 124 for supporting instrument cases by their handles. Also included on entry wall 16 is window 125, and hand tool holders 126 and 127, including horizontally projecting shelves with holes therein for receiving hand tools such as screwdrivers. Storage shelves 118 and 119, and L-shaped brackets 122 through 124 store instruments and instrument cases waiting to be repaired in an orderly fashion.

Instrument support table 51 is more particularly shown in FIG. 7 in an erected position. Table 51 includes top horizontal surface 130, hingedly attached at edge 54 by hinge 131 to mounting board 132 attached to opposite wall 17. Support legs 56 and 57 are hingedly attached at support edge 55 of table 51 by hinges 133 and 134. Support legs 56 and 57 are attached to floor 19 by anchoring plates 135 and 136 attached to the ends of the legs and having holes therein for wing screws 59 and 60 to be received and screwed into threaded inserts 161 and 162 inserted flush into floor 19. To store instrument support table 51, support legs 56 and 57 are folded inwardly beneath top surface 130 and the table is then folded downwardly about hinge 134 to rest against opposite wall 17.

Referring now to FIGS. 9 and 10, abutting post 53 is shown and will now be more particularly described. Abutting post 53 includes wooden main body 139 including cylindrical portion 140, domed end 141 and flat end 142. Metal rod 143 extends perpendicularly from flat end 142 to be received by receiving holes 52 in instrument support table 51. In the preferred embodiment, cylindrical portion 140 is covered by thin layer of cork material 144.

Figure 11:
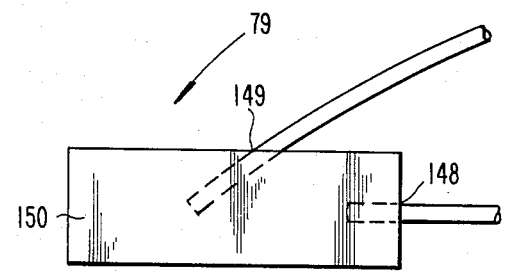
FIG. 11 is a fragmentary enlarged front view of the mandrel holder shown in FIG. 4, particularly showing mandrels being held in two alternative positions.
Figure 12:
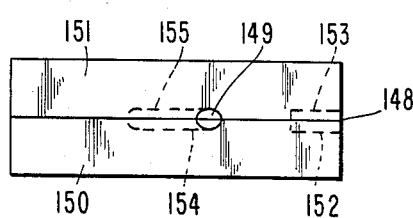
FIG. 12 is a top view of the mandrel holder shown in FIG. 11.
Figure 13:
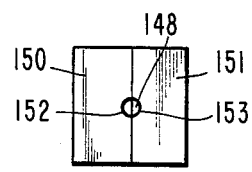
FIG. 13 is a side view of the mandrel holder shown in FIG. 11.

Mandrel holding fixture 79 is shown in FIGS. 11 through 13 and will now be more particularly described. Mandrel holding fixture 79 includes mating members 150 and 151. Mating member 150 includes semi-cylindrical channels 152 and 154, and mating member 151 includes semi-cylindrical channels 153 and 155. Channels 152 and 153 form mounting hole 148, and channels 154 and 155 form mounting holes 149 in which mandrels 75 and 76 are held when the mating members are aligned and forced together. Mounting holes 148 and 149 provide different angles at which mandrel 75 and 76 are held, thereby allowing different shaped instruments to be worked on by simply changing mandrels.

While the invention has been illustrated and described in detail in the drawings and foregoing descriptions, the same is to be considered as illustrative and not restrictive in character, it being understood that only the preferred embodiment has been shown and described and that all changes and modifications that come within the spirit of the invention are desired to be protected.

What is claimed is:

1. A portable facility for repairing band instruments comprising:

a mobile chassis;
 an enclosed structure mounted to said chassis;
 table means mounted within said enclosed structure for supporting a variety of band instruments, said table means including a top surface having a plurality of spaced apart receiving holes;
 a plurality of abutting posts, said abutting posts being received into the receiving holes and extending upwardly from the top surface, said abutting posts being positioned in the receiving holes in various configurations to cause said abutting posts to abut against the variety of shapes of band instruments to be supported by said table means; and,
 the abutting posts include a wooden main body having a first end and a second end, and a metal post projecting from the first end, the metal post being received into a receiving hole, the second end including a domed portion, the wooden main body including a cylindrically-shaped portion between the first end and the domed portion.

2. The apparatus of claim 1 in which:
 the top surface is rectangular having a first mounting edge and a second opposite supporting edge, the mounting edge being hingedly attached within said enclosed structure, and said table means includes two legs hingedly attached to opposite ends of the supporting edge, the two legs providing support to the top surface in a horizontal position and being foldable to no longer provide support, thereby allowing hinging of the top surface at the mounting edge.

3. The apparatus of claim 2 in which:
 the cylindrically-shaped portion is covered with a thin layer of cork material.

4. A portable facility for repairing band instruments comprising:

a mobile chassis;
 an enclosed structure mounted to said chassis;
 table means mounted within said enclosed structure for supporting a variety of band instruments, said table means including a top surface having a plurality of spaced apart receiving holes;
 a plurality of abutting posts, said abutting posts being received into the receiving holes and extending upwardly from the top surface, said abutting posts being positioned in the receiving holes in various configurations to cause said abutting posts to abut against the variety of shapes of band instruments to be supported by said table means;
 a plurality of mandrels being shaped and sized to be received into the cavities of various band instruments; and,
 mandrel mounting means attached within said enclosed structure for interchangeably holding said mandrels.

5. The apparatus of claim 4 in which:
 said mandrel mounting means includes two mating members, each mating member having a plurality of semi-cylindrical channels forming cylindrical holes in which said mandrels are held when the mating members are aligned and forced together.

6. The apparatus of claim 5 and further comprising:
 a vise attached within said enclosed structure, the mating members being grippingly forced together by said vise.

7. A mobile band instrument repair shop comprising:
 a frame;
 a plurality of ground-engaging wheels rotatably mounted on said frame;
 a body mounted on said frame, said body having a pair of oppositely disposed sides, a pair of oppositely disposed ends, a floor, and a ceiling, said body including a door providing entry to the interior of said body;

hitch means attached to said frame for connecting said frame to a drive source to transport the shop;

a bottled gas distribution system including a gas storage tank mounted to said frame, tubing connected to the tank, and selected distribution locations in the interior of said body, the tubing extending from the tank to the selected distribution locations;

an electrical distribution system operatively disposed within said body, said electrical distribution system including a receptacle on the exterior of said body connectable to a source of electrical energy, and a plurality of electrical outlets on the interior of said body, the electrical outlets being electrically connected to the receptacle;

a table mounted within said body including a top surface, the top surface having a plurality of spaced apart receiving holes;

a plurality of abutting posts, said abutting posts being received into the receiving holes and extending upwardly from the top surface, the abutting posts being positioned in the receiving holes in various configurations to cause said abutting posts to abut against the variety of shapes of band instruments to be supported by said table means;

a plurality of mandrels being shaped and sized to be received into the cavities of various band instruments;

mandrel mounting means for interchangeably holding said mandrels including two mating members, each mating member having a plurality of semi-cylindrical channels forming cylindrical holes in which said mandrels are held when the mating members are aligned and forced together; and a vise attached to said body, the mating members being grippingly forced together by said vise.

8. The apparatus of claim 7 in which:
the abutting posts include a wooden main body having a first end and a second end, and a metal post projecting from the first end, the metal post being received into a receiving hole, the second end including a domed portion, the wooden main body including a cylindrically-shaped portion between the first end and the domed portion.

9. The apparatus of claim 8 in which:
the top surface is rectangular having a first mounting edge and a second opposite supporting edge, the mounting edge being hingedly attached within said body, and said table means includes two legs hingedly attached to opposite ends of the supporting edge, the two legs extending from the supporting edge to the floor and providing support to the top surface in a horizontal position and being foldable to no longer provide support, thereby allowing hinging of the top surface at the mounting edge.

10. The apparatus of claim 9 in which:
the cylindrically-shaped portion is covered with a thin layer of cork material.

11. The apparatus of claim 7 and further comprising:
a plurality of tapered bannister rods removably mounted at one end to the floor and extending upwardly, said bannister rods being received into cavities in band instruments to hold the band instruments.

12. The apparatus of claim 11 in which:
said bannister rods include an externally threaded projection and the floor includes a plurality of threaded inserts being complementary to the threaded projections to removably mount said bannister rods to the floor.

13. The apparatus of claim 7 and further comprising:
a horizontal shelf attached within said body including a plurality of upwardly projecting dowel rods to be received into cavities in band instruments to hold the band instruments.

14. The apparatus of claim 7 and further comprising:
a horizontal work surface attached within said body including a heat resistant portion, and a Bunsen Burner connected to said bottled gas distribution system, the Bunsen burner being mounted on the heat resistant portion.

15. The apparatus of claim 14 and further comprising:
gas heating means mounted within said body and connected to said bottled gas distribution system for heating the interior of said body.

16. The apparatus of claim 7 and further comprising:
means adjoining said frame for adjustably leveling and stabilizing said body including a plurality of adjustably ground-engaging jacks positioned at locations about said frame.

17. A mobile band instrument repair shop comprising:
a frame;

a plurality of ground-engaging wheels rotatably mounted on said frame;

a body mounted on said frame, said body having a first entry wall, a second opposite wall, a third front wall, a fourth back wall, a floor, and a ceiling, said body including a door located on the entry wall near the front wall providing entry to the interior of said body;

a customer service and instrument receiving station located along the third front wall, said customer service and receiving station including a table and a chair attached to said body; and a brass department located along the second opposite wall including a first work station near the third front wall and a second work station located toward the fourth back wall, the first work station including table means attached to said body for supporting various band instruments and torch means for heating the band instruments during soldering and welding operations, the second work station including an electrically-powered rotary metal brush, a plurality of mandrels, and mandrel holding means for interchangeably holding the mandrels, the mandrels being shaped and sized to insert into various band instruments to provide support and backing during dent removal operations, the second station also including tapered bannister rods removably mounted at one end to the floor directly in front of the second work station, the bannister rods extending upwardly and being received into cavities in band instruments to hold the band instruments completed or waiting to be operated on at the second station.

18. The apparatus of claim 17 and further comprising:
a woodwind department located along the fourth back wall including a work surface attached to and extending outwardly from the fourth back wall, storage compartments for band instrument parts and work tools located beneath the work surface, a first horizontal shelf attached to the second opposite wall and extending partially over the work surface, the first shelf including a plurality of upwardly projecting dowel rods to be received into cavities in band instruments to hold the band instruments completed or waiting to be operated on in said woodwind department, and a Bunsen burner, said work surface having a heat resistant portion on which the Bunsen burner is mounted.

19. The apparatus of claim 18 and further comprising: a storage area located along the first entry wall including a plurality of second horizontal shelves on which band instruments may be stored, the band instruments on the second shelves either awaiting repair or having been repaired, said storage area also including a plurality of L-shaped brackets attached to and extending outwardly from the first entry wall, the brackets engaging the handles on cases of the band instruments, thereby storing the cases in a hanging position.

* * * * *